Dec. 11, 1951 W. H. ROOKSBY 2,578,598

APPARATUS FOR REINFORCING ASBESTOS-CEMENT SHEETS

Filed June 1, 1946 5 Sheets-Sheet 1

Inventor:-
William H. Rooksby
by
Thomas E. Scofield
Attorney.

APPARATUS FOR REINFORCING ASBESTOS-CEMENT SHEETS

Filed June 1, 1946 5 Sheets-Sheet 2

William H. Rooksby, Inventor.
by
Thomas E. Scofield, Attorney.

Dec. 11, 1951 W. H. ROOKSBY 2,578,598

APPARATUS FOR REINFORCING ASBESTOS-CEMENT SHEETS

Filed June 1, 1946 5 Sheets-Sheet 3

Inventor:-
William H. Rooksby
by
Thomas E. Scofield.
Attorney.

APPARATUS FOR REINFORCING ASBESTOS-CEMENT SHEETS

Filed June 1, 1946 5 Sheets-Sheet 4

Inventor:—
William H. Rooksby,
by
Thomas E. Scofield,
Attorney.

APPARATUS FOR REINFORCING ASBESTOS-CEMENT SHEETS

Filed June 1, 1946 5 Sheets-Sheet 5

William H. Rooksby, Inventor
by
Thomas E. Scofield,
Attorneys

Patented Dec. 11, 1951

2,578,598

UNITED STATES PATENT OFFICE 2,578,598

APPARATUS FOR REINFORCING ASBESTOS-CEMENT SHEETS

William Holdsworth Rooksby, Trafford Park, Manchester, England, assignor to Turners Asbestos Cement Company Limited, Spotland, Rochdale, England, a British company Application June 1, 1946, Serial No. 673,791
In Great Britain June 8, 1945

10 Claims. (Cl. 92—66)

Numerous proposals have been made to reinforce asbestos-cement or like sheets of the kind made by coating a rotating cylinder with the material in a moist state. The most common form of machine including such a rotating cylinder is of the Hatschek type in which successive laminations of the moist material are transferred from a carrier band to the cylinder (which is commonly known as a forming bowl). The prior proposals have included the introduction of metal reinforcement while the material is still on the forming bowl, but in practice it is necessary to slow down or stop the whole process in order to introduce the reinforcement. The need for this arises from the fact that when the laminations have built up to the desired thickness a cut must be made parallel to the axis so that the laminated covering on the forming bowl can be detached from it and removed as a sheet. A groove is commonly made along the bowl and may be called the parting-off line, a knife being run along this groove by the operator to make the cut. Now the reinforcement, if it is to be introduced into the material on the forming bowl, must not cross this groove, and yet its ends must lie very close to the groove if it is to extend throughout the whole length of the resultant sheet. Accordingly it must be placed on the partly built-up material on the rotating bowl with great accuracy, and at present the forming bowl is either stopped or reduced in speed enough to allow the reinforcement which usually is wire mesh, to be introduced manually.

The use of a number of parallel wires instead of wire mesh has advantages, both in manufacture and in service.

A practical object of this invention is to provide means for introducing wires on the forming bowl without stopping or even reducing the speed of rotation of the bowl.

Another object of this invention is to time the introduction of reinforcing wires into a coating built up on a rotating cylinder so as to bring the ends of the wires close to the parting-off line.

Other objects will appear hereinafter.

In my invention predetermined lengths of wire are fed to the rotating cylinder to become wrapped around it while the coating is being formed, and in order to ensure that the wires are located in predetermined positions in relation to the parting-off line the feeding is controlled by means actuated when the parting-off line is in a predetermined angular position in the course of the rotation of the cylinder. In effect, I provide means for feeding the wires to the cylinder and means for timing the feeding means to bring the wires to predetermined positions. I prefer to feed the wires from rest positions from which they are released in a given revolution of the cylinder (which may be determined by the operator or automatically) but at an instant in that revolution which is determined automatically once the necessary setting has been made.

In the application of the invention to a machine of the Hatschek type the wires are brought into contact with the carrier band to move forwards with it and become wrapped around the cylinder, and the means actuated in accordance with the position of the parting-off line time the movement of the wires into contact with the band.

By means of the invention I am able to allow the forming bowl to rotate with undiminished speed during the introduction of the reinforcing wires.

Preferably the wires are fed forwards to encounter a stop device and the timing means operate the stop device to allow the wire feed to begin again at a pedetermined point in the rotation of the cylinder. This point is such that in the time taken for the leading ends of the wires to reach the cylinder from the rest positions the cylinder will have rotated through a further angle which will bring the parting-off line just past the points at which the leading ends of the wires make contact with the cylinder.

The preferred form of apparatus according to the invention, together with some modifications, will now be described by way of example with reference to the accompanying drawings, in which.

Figure 1:
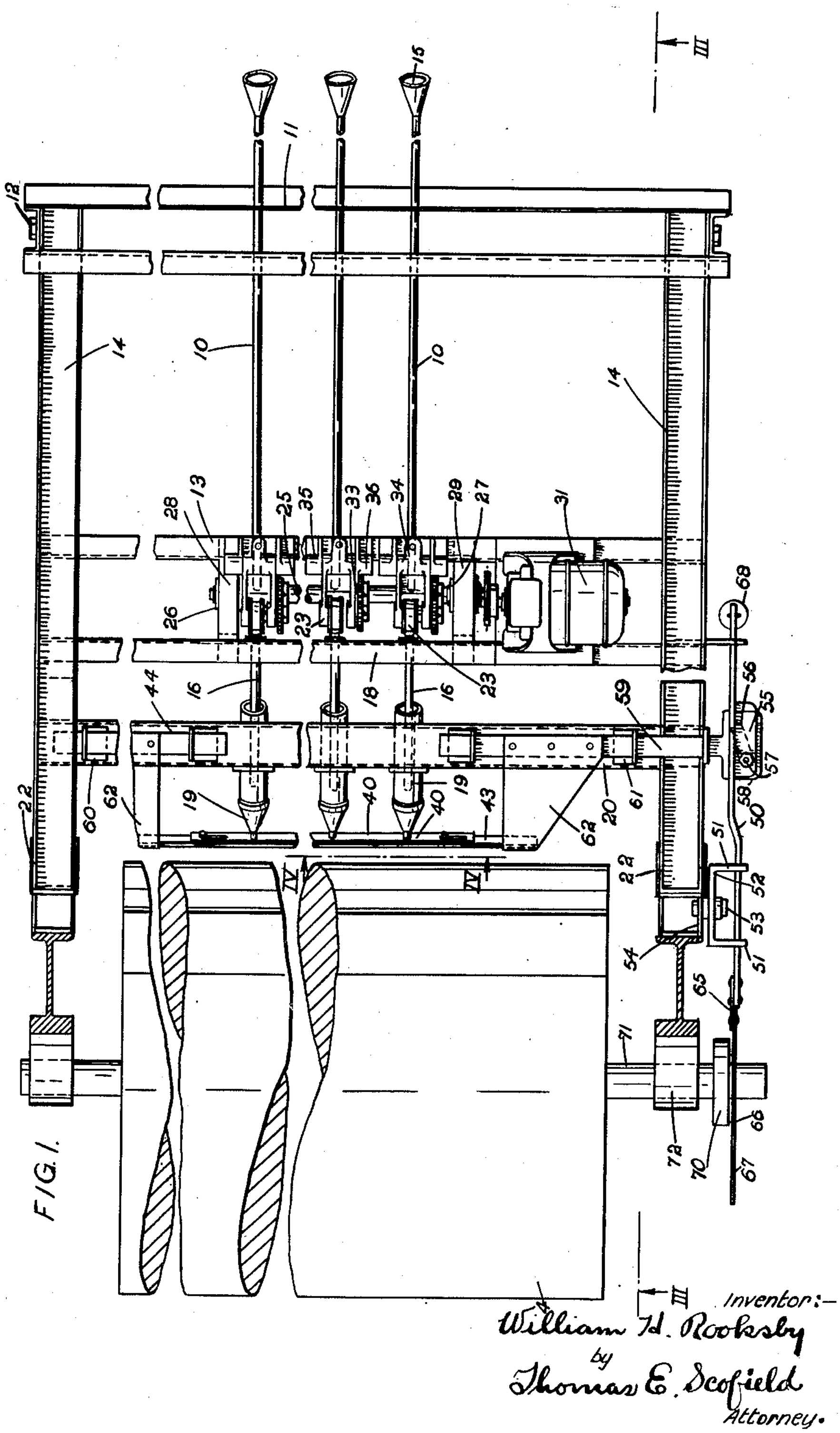
Figure 1 is a plan of the preferred form of apparatus.
Figure 2:
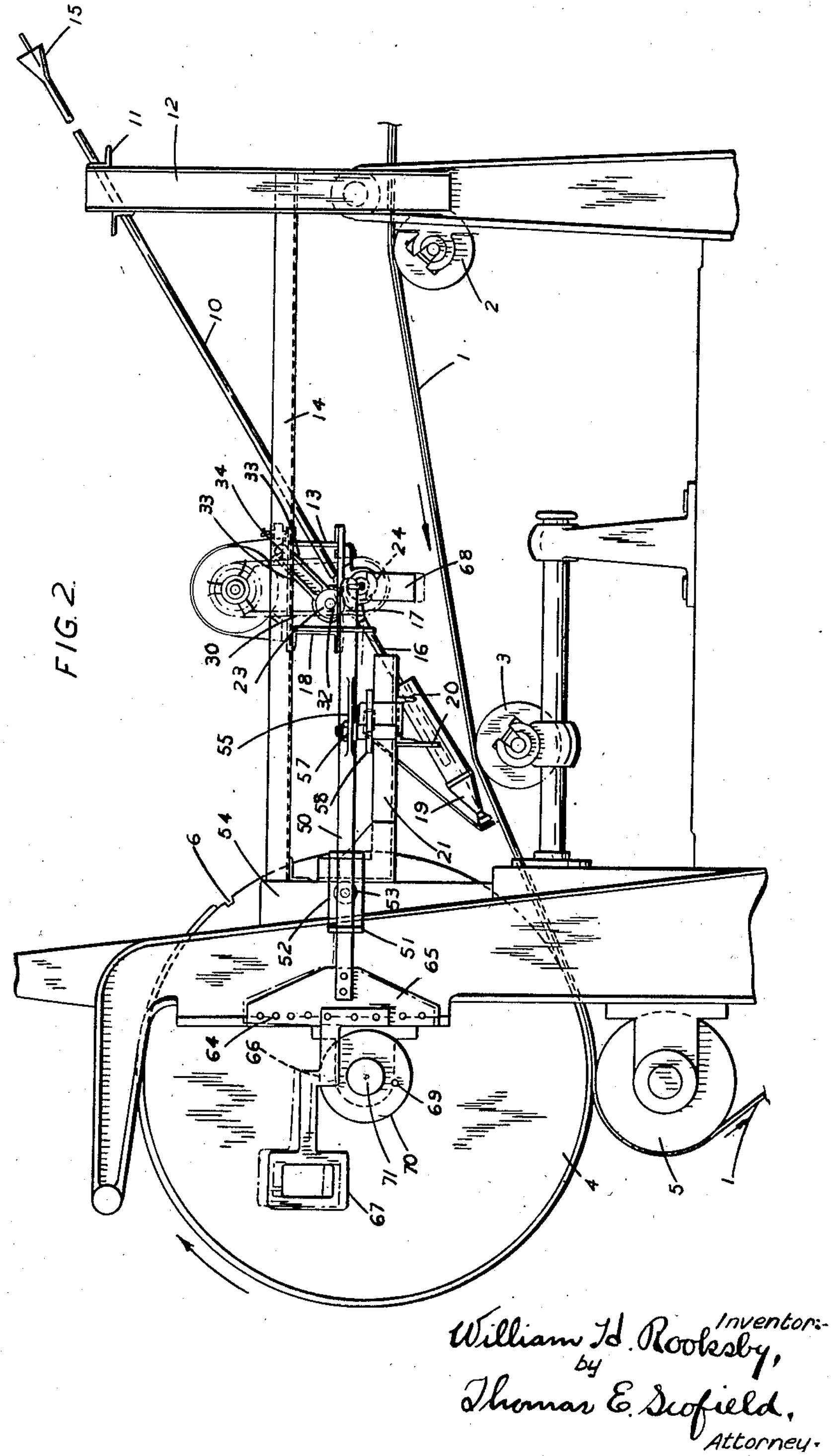
Figure 2 is a side elevation of the apparatus shown in Figure 1.
Figures 3, 4:
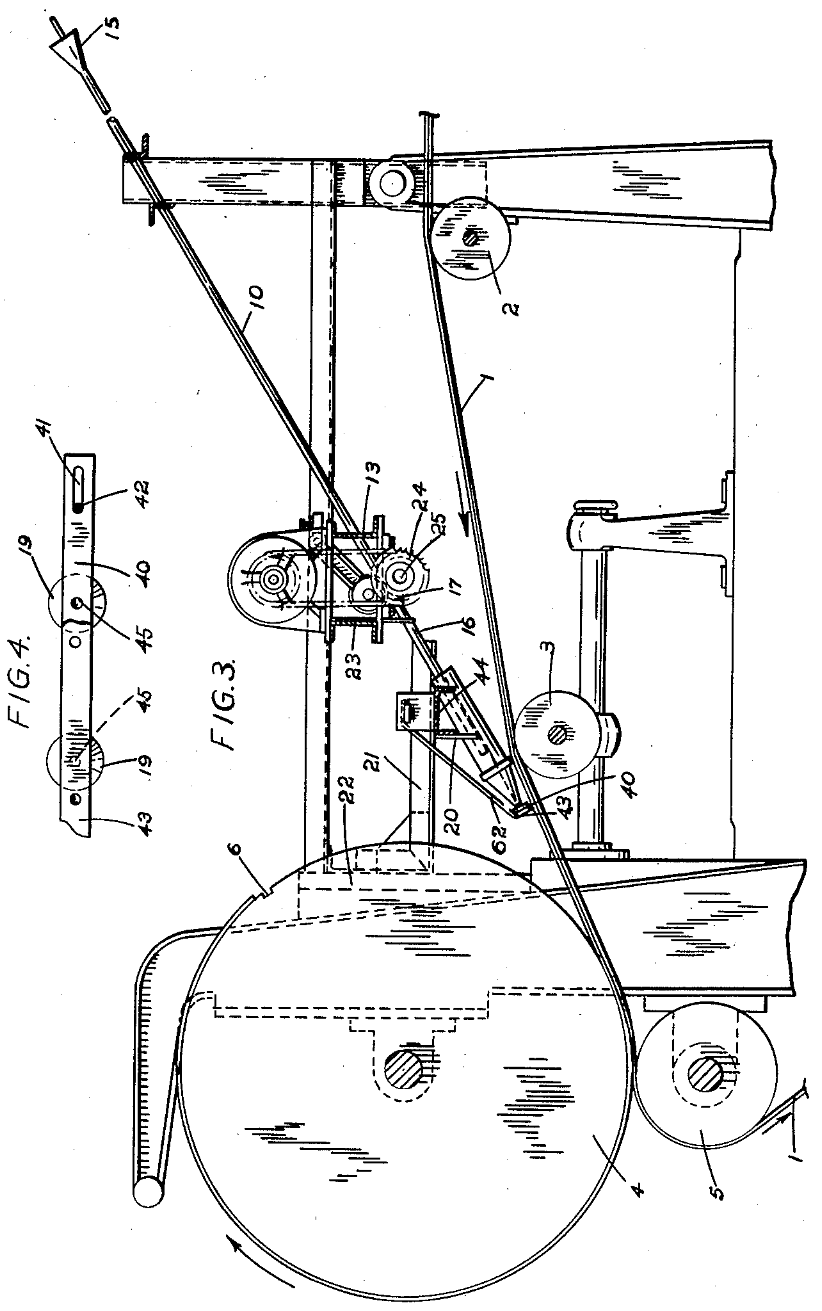
Figure 3 is a section on the line III—III in Figure 1.
Figure 4 is a section on the line IV—IV in Figure 1.

Figures 1 to 3 show one application of the invention to a making machine of the Hatschek type in which an endless felt band 1 picks up asbestos-cement slurry and after passing over various suction boxes travels over rollers 2 and 3 into contact with a rotary cylinder or forming bowl 4. The asbestos-cement is transferred to the forming bowl at the point where the band 1 passes through the nip between the forming bowl and a pressure roller 5, and as the operation proceeds successive laminations are built up on the bowl. A groove or parting-off line 6 is made along the bowl to form a guide for a knife by which the accumulated laminations are cut when the desired thickness has been reached, the covering on the bowl then leaving the bowl as a flat sheet during the continued rotation of the bowl. This type of machine is well known.

The means for introducing reinforcing wires between two laminations of asbestos-cement on the forming bowl 4 comprise inclined tubes 10 mounted at their upper ends in horizontal brackets 11 fixed to vertical frame members 12 and mounted at their lower ends in brackets 13 fixed to the undersides of horizontal frame members 14. The tubes 10 have funnel-shaped mouths 15 and they are aligned with further tubes 16, also having funnel-shaped mouths 17, which are carried in downward extensions of brackets 18 and extend into nozzles 19 carried by brackets 20 fixed to a horizontal frame member 44 which spans the distance between and is fixed to the undersides of frame members 21. These in turn are disposed below the frame members 14 and secured to vertical frame members 22. Each pair of aligned tubes 10 and 16 may be regarded as a single interrupted tube into which a reinforcing wire is placed by the operator when the building-up of a fresh laminated covering on the forming bowl 4 begins. Each such wire is, of course, of exactly the right length for the reinforcement of the sheet that is being made.

Figures 5, 6, 7, 8, 9:
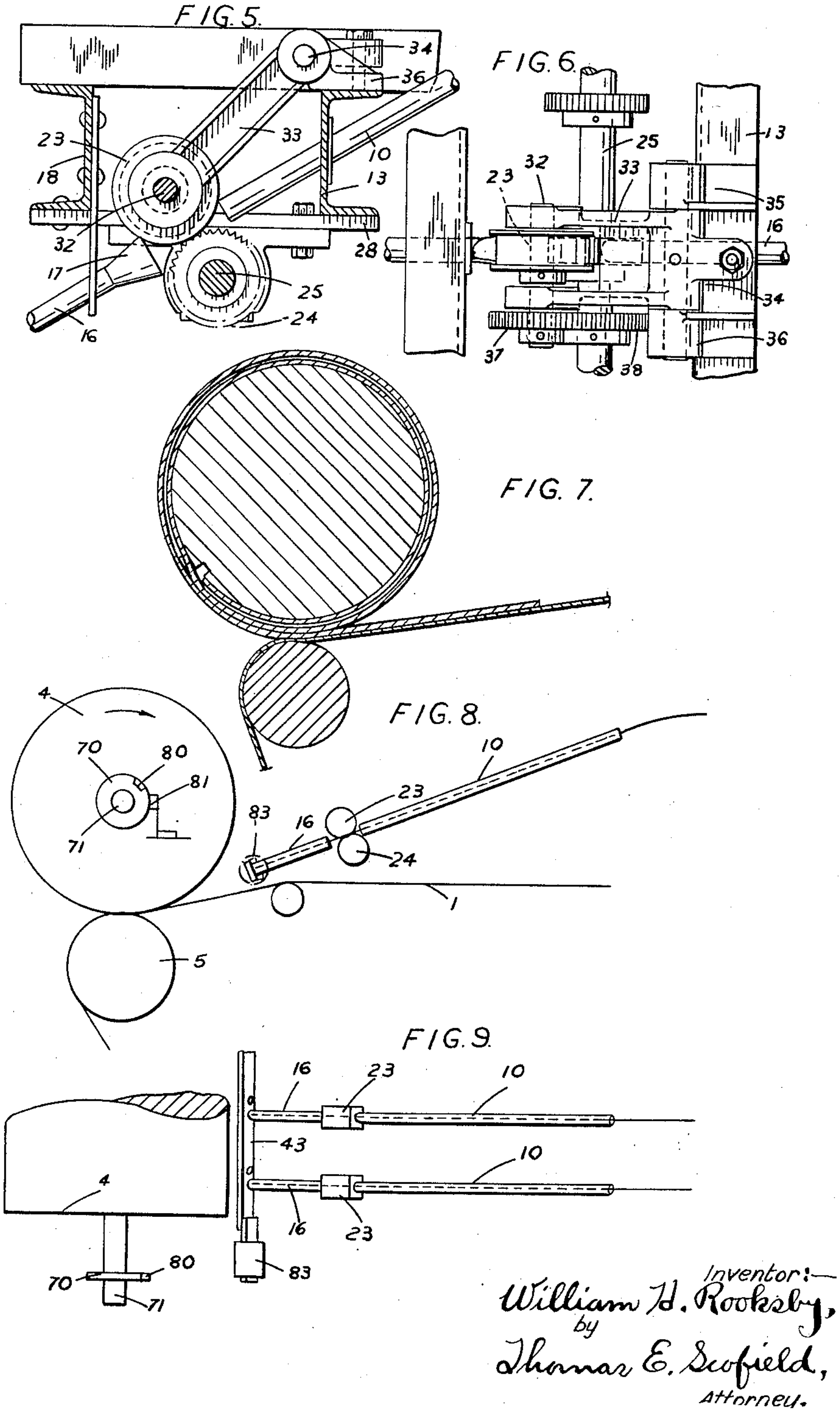
Figures 5 and 6 are an elevation and plan respectively, showing certain parts on a larger scale.
Figure 7 shows diagrammatically the position of a wire on a rotating cylinder in relation to the parting-off line.
Figure 8 is a diagrammatic elevation to illustrate the operation of a modified apparatus.
Figure 9 is a plan of Figure 8.
Figures 10, 11:
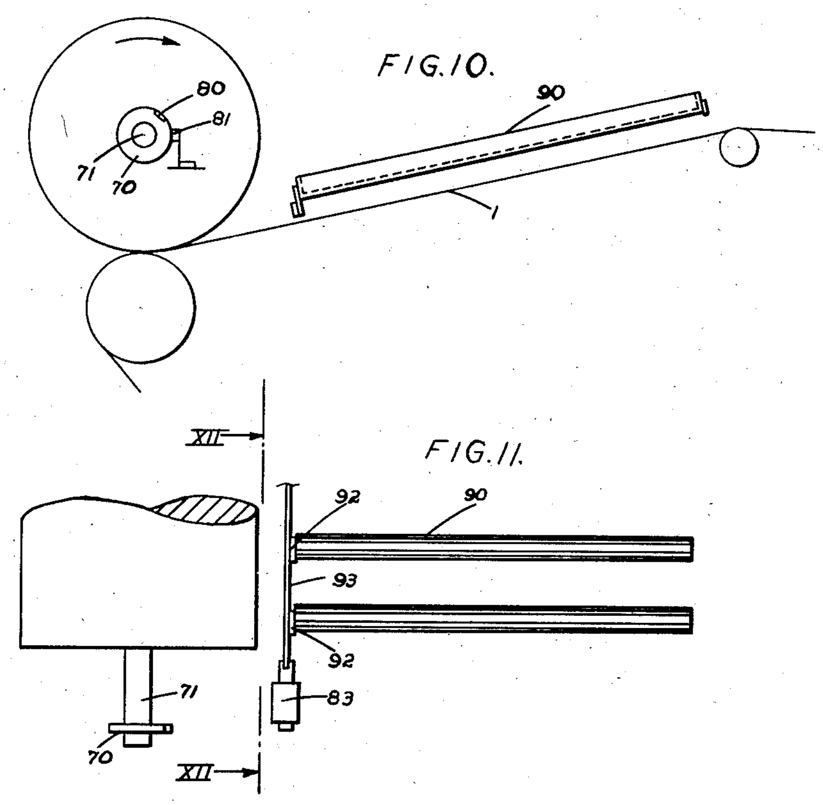
Figures 10 and 11 are diagrams, similar to Figures 8 and 9, of another modified apparatus.
Figure 12:
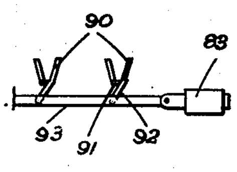
Figure 12 is a view on the line XII—XII in Figure 11.
Figure 13:
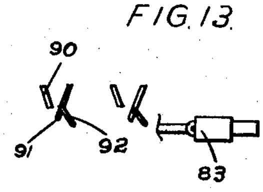
Figure 13 is similar to Figure 12 but shows the parts in another operating position.

At the interruption between the tubes 10 and 16 each wire is frictionally engaged by a pair of rollers 23 and 24 (see Figures 5 and 6) and urged forward by these. Each roller 24 is keyed to a shaft 25 which extends beneath the lower ends of all the tubes 10, being carried in bearings 26 and 27 secured to the undersides of brackets 28 and 29 which span the distance between the brackets 13 and 18. This shaft 25 is continuously driven through a chain 30 by an electric motor 31 which is carried by the brackets 13 and 18. Each roller 23 is keyed to a spindle 32 mounted in a forked carrier 33 which can rock as a whole about a spindle 34 carried by bearings 35 and 36 secured to the brackets 13. The spindle 32 carries a gear wheel 37 which meshes with another wheel 38 keyed to the shaft 25, so that each roller 23 is continuously driven but can move slightly away from the roller 24, by reason of the ability of the carrier 33 to rock, without breaking the meshing engagement of the wheels 37 and 38. In consequence the grip of the rollers 23 and 24 is strong enough to ensure positive feed of the wire down the tube 16, but if the wire is held the rollers 23 and 24 will slip on the wire, i. e. turn without moving the wire.

All the nozzles 19 are united at their ends by a bar 40 which is formed with slots 41 which receive bolts 42 extending from a plate 43, which is thus secured to but able to slide over the bar 40 within the limits set by the length of the slots 41. This plate 43 is a stop device or barrier for the wires and it is formed with ports 45 which can be brought into and out of register with the outlet ends of the nozzles 19 by sliding the plate 43 longitudinally. When the ports are in such register the wires can pass through them but when they are out of register the wires are stopped, that is to say, are held in fixed rest positions with their leading ends abutting against the plate 43 until this plate is moved to bring the ports into register with the nozzles and let the wires move forward under the action of the rollers 23 and 24.

The plate 43 normally closes the ends of all the nozzles 19, and the operator determines in which revolution of the forming bowl 4 the feed of the wires from the rest positions shall begin. If, however, he were merely to move the plate 43 by hand, the beginning of the wire feed would depend upon his judgment and the wires would rarely be wrapped around the forming bowl in the proper position in relation to the parting-off line 6. The actual instant at which the feeding begins is determined mechanically by a trip device mechanism for moving the plate 43 when the forming bowl is in a predetermined angular position. This trip device mechanism comprises a rod 50 which can slide longitudinally in slotted arms 51 of a bracket 52 mounted to rock about a pivot pin 53 carried in a vertical frame member 54. The rod 50 carries a plate 55 which acts as a mounting for a pin 57 which extends downwards through an inclined slot 56 in the head 58 of a bar 59. This bar is slidably mounted in brackets 60 and 61 fixed to the member 44. Two cranked plates 62 are fixed to the bar 59 and also to the plate 43. In consequence, longitudinal movement of the rod 50 causes longitudinal movement of the plate 43 through the pin-and-slot connection 57, 56.

At one end the rod 50 is connected by a plate 65 to a cranked arm 66 which terminates in a handle 67 and at its other end it carries a weight 68. This weight urges the rod 50 clockwise (as seen in Figure 2) about the pivot pin 53. When the operator decides to let the wire feed begin he pulls the handle 67 downwards and brings the cranked part of the arm 66 into the path of a pin 69 on a disc 70 secured to a shaft 71 which is in fact the shaft of the forming bowl 4 and is carried in a bearing 72. The pin 69 and the arm 66 are in effect a cam-and-follower device which determines the exact moment at which the plate 43 is moved, since when the pin 69 strikes the cranked part of the arm 66 the rod 50 is moved to the right as seen in Figure 2, and the plate 43 is moved to release the wires. In short, the operator determines in which revolution of the forming bowl the feed shall begin but the mechanical devices described determine the exact point in that rotation at which it begins. After the pin 69 has moved past the cranked part of the arm 66 in the continued rotation of the forming bowl and the wires have passed the ported plate 43 the operator pulls the handle to the left, i. e. retracts the rod 50, so that the plate 43 again closes the ends of the nozzles 19. When the operator releases the handle the weight 68 causes the rod 50 to rock back to the normal or inoperative position.

In practice, interchangeable forming bowls of different diameters are used, and for this reason the plate 65 is made with a number of holes 64 by which the cranked arm 66 can be bolted to the plate 65 in different positions to allow for the variation in the vertical position of the shaft 71 with the size of the forming bowl.

The nozzles 19 direct the wires onto the conveyor band 1 so that they move forwards with it to pass into the nip between the forming bowl 4 and the pressure roller 5. Here they wrap themselves round the forming bowl, being immediately covered by the layer of asbestos-cement transferred from the band to the forming bowl.

The wires will only wrap themselves round the forming bowl in the manner described if they are flexible, and of course the smaller the forming bowl the more flexible the wires must be to accommodate themselvees to the sharper curvature. In practice, it is found that 17 gauge steel wires of 100/110 tons per sq. inch tensile strength will wrap themselves round a forming bowl 8 feet in circumference in the manner described above.

It will readily be appreciated that all that is required to ensure that the leading ends of the wires come into contact with the asbestos-cement already on the forming bowl just behind the parting off line 6 is to set the pinned disc 70 in the appropriate angular position on the shaft 71. The wires will then be embedded in the asbestos-cement in the manner illustrated diagrammatically in Figure 7.

The mechanical devices described may be replaced by electrical devices, e. g. a switch closed by the forming bowl at a predetermined point in the rotation of the latter and a solenoid for moving a ported plate. This is illustrated diagrammatically in Figures 8 and 9, where a switch contact 80 carried by the disc 70 on the shaft 71 of the forming bowl 4 makes contact in each revolution of the forming bowl with a contact 81, the contacts being included in a circuit containing both a manually operated switch (not shown) and the operating coil of a solenoid 83, the armature of which is connected to the ported plate 43. The manually operated switch is normally open and is closed during that revolution of the forming bowl in which the solenoid is to be actuated to move the plate 43.

Instead of feeding the wires forward and stopping them in their rest positions they may be placed in these manually and released by the timing means. For instance they may be put in troughs above the conveyor band and allowed to drop onto this band by opening doors or the like in the bottoms of the troughs through timing means. This is illustrated by Figures 10 to 13, which show troughs 90, the bottoms of which are formed by pivoted doors 91, each of which is rigidly connected by an arm 92 to a rod 93 which in turn is connected to the armature of a solenoid 83. This solenoid is actuated in the same way as that shown in Figures 8 and 9, and when the rod 93 is moved from the position shown in Figure 12 to that shown in Figure 13 the doors 91 open and allow the wires previously placed in the troughs 90 to drop onto the band 1.

I claim:

1. An apparatus for making asbestos-cement or like sheets by coating a rotary cylinder with the material in a moist state and when the layer of material is thick enough making a cut through it along a parting-off line parallel to the axis of the cylinder, characterised by means for feeding reinforcing wires in an endwise direction to the cylinder as it rotates to cause the wires to become wrapped circumferentially around the cylinder said means including a trip device operable to initiate the feeding of said wires, and means connected to and moving with said cylinder for automatically tripping said device when the parting-off line reaches a predetermined angular position in the course of the rotation of the cylinder thereby to cause said feeding means to bring the reinforcing wires into predetermined positions on the cylinder in relation to the parting-off line.

2. In combination with a rotary windup mandrel for receiving a web of plastic material thereby to form a multi-layer tube which is adapted subsequently to be cut from the mandrel along a parting-off line parallel to the axis of the tube, means for storing reinforcing wires so they are disposed longitudinally of the advancing web with one end adjacent the point where the web reaches the mandrel, a control device connected to said mandrel and operable in any selected revolution thereof mechanism controlled by said device and operated responsive to the mandrel thereafter reaching a predetermined angular position in the selected revolution for feeding the wires from storage into the space between the advancing web and the last layer already formed on the tube thus to cause the wires to be wrapped around the mandrel between superposed layers of the tube.

3. In combination with a rotary windup mandrel for receiving a web of plastic material thereby to form a multi-layer tube which is adapted subsequently to be cut from the mandrel along a parting-off line parallel to the axis of the tube, wires supported longitudinally of the advancing web with one end adjacent the point where the web reaches the mandrel, means urging the wires axially toward said point, a barrier normally preventing the advance of the wires toward said point, and mechanism operative in any selected revolution of the mandrel to remove said barrier at a predetermined angular position of the mandrel thereby to cause the wires to advance and be wrapped around the mandrel between superposed layers of the tube.

4. In combination with a rotary windup mandrel for receiving a web of plastic material thereby to form a multi-layer tube which is adapted subsequently to be cut from the mandrel along a parting-off line parallel to the axis of the tube, wires supported longitudinally of the advancing web with one end adjacent the point where the web reaches the mandrel, means urging the wires axially toward said point, a barrier normally preventing the advance of said wires toward said point, mechanism operative in any selected revolution of the mandrel to move said barrier at a predetermined angular position of the mandrel thereby to cause the wires to advance and be wrapped around the mandrel between superposed layers of the tube, and means operable at will to select the revolution in which said mechanism removes the barrier.

5. A combination as in claim 3 wherein said wire urging means comprises at least one power operated roller frictionally engaging each wire, such engagement being strong enough to positively advance the wire when the barrier is withdrawn, yet light enough to permit the roller to slip on the wire when the barrier is effective.

6. In combination with a rotary windup mandrel for receiving a web of plastic material thereby to form a multi-layer tube which is adapted subsequently to be cut from the mandrel along a parting-off line parallel to the axis of the tube, wires supported longitudinally of the advancing web with one end adjacent the point where the web reaches the mandrel, means urging the wires axially toward said point, a stop device normally preventing the advance of the wires toward said point, a cam driven by the mandrel, a cam follower, means operative in any selected revolution of the mandrel for bringing the follower into the path of said cam, and means thereafter controlled by the follower when actuated by the cam for removing the stop device thereby to cause the wires to advance and be wrapped around the mandrel between superposed layers of the tube.

7. Apparatus for making asbestos-cement or like sheets by coating a rotary cylinder with a material in a moist state and then, when it is thick enough on the cylinder, making a cut through the coating along a parting-off line parallel to the axis of the cylinder, characterized by means for feeding reinforcing wires to the cylinder as it rotates to cause the wires to be wrapped around the cylinder, said means comprising tubes along which the wires are fed, a ported plate normally closing the ends of the tubes, and means actuated when the parting-off line reaches a predetermined angular position in the course of rotation of the cylinder for shifting said plate to bring the ports into register with the ends of the tubes thereby to release the wires and bring same into predetermined positions on the cylinder in relation to the parting-off line.

8. Apparatus for making asbestos-cement or like sheets by coating a rotary cylinder with a material in a moist state and then, when it is thick enough on the cylinder, making a cut through the coating along a parting-off line parallel to the axis of the cylinder, characterized by means for feeding reinforcing wires to the cylinder as it rotates to cause the wires to be wrapped around the cylinder, said means comprising a stop device provided to stop the wires in rest positions, means actuated at a predetermined angular position relative to the parting-off line to withdraw the stop device, and pairs of driving rollers each gripping a wire frictionally with a grip light enough to allow the rollers to slip on the wires when the stop device is effective yet strong enough to positively feed the wires to the cylinder when the stop device is withdrawn, thereby to bring the wires into predetermined positions in relation to the parting-off line.

9. In combination with a rotary mandrel for winding up a web of plastic material to form a multi-layer tube which is adapted subsequently to be cut from the mandrel along a parting-off line parallel to the axis of the tube, means for temporarily storing a set of reinforcing wires so they are disposed longitudinally of the advancing web with one end of each wire adjacent the point where the web reaches the mandrel, the separate wires being spaced laterally from one another across the web, mechanism for feeding the wires longitudinally from storage into the space between the advancing web and the last layer already formed on the tube thus to cause the wires to be wrapped circumferentially around the mandrel between superposed layers of the tube, a control device connected to said mandrel and operable in any selected revolution thereof, and means actuated by said device for initiating the operation of said feeding mechanism, whereby the ends of the wires occupy a predetermined position with respect to said parting-off line.

10. In combination with a rotary mandrel for winding up a web of plastic material to form a multi-layer tube which is adapted subsequently to be cut from the mandrel along a parting-off line parallel to the axis of the tube, mechanism for feeding reinforcing wires endwise and longitudinally of the web into the space between the advancing web and the last layer already formed on the tube thus to cause the wires to be wrapped circumferentially around the mandrel between superposed layers of the tube, a control device connected to said mandrel and operable in any selected revolution thereof, and means actuated by said device for initiating the operation of said feeding mechanism whereby the leading ends of the wires are located in the tube in predetermined positions relative to the parting-off line.

WILLIAM HOLDSWORTH ROOKSBY.

REFERENCES CITED

The following references are of record in the file of this patent:

UNITED STATES PATENTS

| Number | Name | Date |
|---|---|---|
| 750,319 | Tarbett | Jan. 26, 1904 |
| 800,839 | Watson | Oct. 3, 1905 |
| 869,116 | Wade | Oct. 22, 1907 |
| 1,771,749 | Eisenhardt | July 29, 1930 |
| 1,931,494 | Hurden et al. | Oct. 24, 1933 |
| 2,285,447 | Lichter | June 9, 1942 |
| 2,396,104 | Kingman | Mar. 5, 1946 |